United States Patent [19]

Block

[11] 4,349,443
[45] Sep. 14, 1982

[54] VISCOSIFIER AND FLUID LOSS CONTROL SYSTEM

[75] Inventor: Jacob Block, Rockville, Md.

[73] Assignee: W. R. Grace & Co., New York, N.Y.

[21] Appl. No.: 239,079

[22] Filed: Feb. 27, 1981

Related U.S. Application Data

[63] Continuation-in-part of Ser. No. 169,884, Jul. 17, 1980, abandoned, which is a continuation-in-part of Ser. No. 141,852, Apr. 21, 1980, abandoned, which is a continuation-in-part of Ser. No. 121,226, Feb. 13, 1980, abandoned.

[51] Int. Cl.$^3$ .............................................. C09K 7/02
[52] U.S. Cl. .............................. 252/8.5 A; 252/8.5 C; 525/61
[58] Field of Search ............. 252/8.5 A, 8.5 B, 8.5 C, 252/8.55 R; 525/61

[56] References Cited

U.S. PATENT DOCUMENTS

| | | | |
|---|---|---|---|
| 2,879,268 | 3/1959 | Jullander | 536/87 |
| 3,756,315 | 9/1973 | Suman et al. | 166/276 |
| 3,852,201 | 12/1974 | Jackson | 252/8.5 |
| 3,860,070 | 1/1975 | Herce et al. | 166/292 |
| 3,872,018 | 3/1975 | Alexander | 252/8.5 |
| 4,045,357 | 8/1977 | Reed | 252/8.5 |
| 4,240,915 | 12/1980 | Block | 252/8.5 |

FOREIGN PATENT DOCUMENTS 356408 9/1931 United Kingdom ................. 525/61

Primary Examiner—Herbert B. Guynn
Attorney, Agent, or Firm—Howard J. Troffkin

[57] ABSTRACT

A composition capable of imparting pseudoplasticity and fluid loss control properties to aqueous systems. The composition is formed from a combination of:
(a) a hydroxy containing aluminum component and
(b) a reaction product of a polyvinyl alcohol and at least 1 percent of stoichiometry of an aldehyde containing or generating agent; wherein the amount of component (a) to component (b) is in the ratio of at least about 0.75:1.

The invention is further directed to improved drilling fluids containing said composition and to the process of drilling bore holes using said improved fluid.

11 Claims, No Drawings

VISCOSIFIER AND FLUID LOSS CONTROL SYSTEM

This is a copending, continuation-in-part application of U.S. Ser. No. 169,884 filed July 17, 1980, now abandoned, which is a continuation-in-part application of U.S. Ser. No. 141,852 filed Apr. 21, 1980, now abandoned which is a continuation-in-part application of U.S. Ser. No. 121,226 filed Feb. 13, 1980, now abandoned.

BACKGROUND OF THE INVENTION

The present invention relates to a composition which is capable of imparting non-Newtonian, pseudoplasticity and water loss controlling properties to aqueous systems. More particularly, the present invention relates to the formation of an improved water-based, clay-free drilling fluid containing the subject composition and to an improved method of drilling bore holes into subterranean formations using said drilling fluid.

In normal well drilling operations in which a well is drilled by a rotary method, the well bore hole is generally filled with a drilling fluid or mud which is circulated therein. Drilling fluids are usually pumped down through the drill stem of the rotary rig, circulated around the drill bit and returned to the surface through the annular passage between the drill stem and well wall. These drilling fluids perform a number of functions including lubricating the drill stem and bit, cooling the bit, carrying the cuttings from the bit up the bore hole to the surface where the cuttings may be separated and disposed of, and providing a hydrostatic head against the walls of the well to contain downhole geopressure.

A primary requisite of a satisfactory drilling fluid is its ability to readily circulate and flow, that is, to have low viscosity, under the high sheer conditions which are present in the environs of the drill bit while, at the same time, being capable of having and maintaining sufficient viscosity to be capable of efficiently carrying the bit cuttings to the surface.

A typical fluid composition contains various agents to impart needed properties to the fluid at different stages in the drilling operation. The drilling fluid must also be capable of inhibiting the amount of liquid, normally water, which is lost into the porous strata through which the bore hole traverses. The loss of liquid causes the formation and build-up of a cake deposit which, after a period of time, can cause sticking of the drill pipe and stoppage of the drilling operation. The fluid must, therefore, be of a nature which permits minimum loss into the porous strata. Agents which impart such property are conventionally termed "water loss controllers".

The drilling fluid must also be capable of exhibiting the above-described water-loss and pseudoplastic properties under changing composition and environmental conditions encountered during the drilling operation due to the fact that the bore hole traverses various strata such as shales, clay, etc., and the cuttings of these materials become dispersed in the fluid media. The drilling fluid components should be substantially stable to the presence of various calcium compounds and to sodium chloride which may be present in the fluid from the soil strata with which it is in contact and/or due to the use of salt water having calcium or sodium salts therein used in forming the drilling fluid.

It is desired that the drilling fluid components should be stable and functional at elevated temperature. It is well known that as the bore hole increases in depth the temperatures encountered are substantially above that found at the earth's surface. Further, heat is generated by frictional forces on the drill bit. It is, therefore, desired that components used in forming drilling fluids be stable with respect to varying elevated temperature conditions.

A wide variety of drilling fluids have been used, including aqueous-based liquids, hydrocarbon based liquids, air and other gases, mist, foams and the like. Since great volumes of drilling fluids are required for the purposes of providing a cooling medium for the rotary bit and a means of carrying off the drilled particles, most of the conventional fluids used have been based on water. Water alone being a Newtonian fluid, does not have the needed capability to efficiently carry the drilled particles from the bore hole to the surface nor the capacity of inhibiting loss of fluid into adjacent porous strata.

It is a widely held and accepted theory that the viscosities suitable for creating a particle carrying capacity in the fluid can be achieved with the drilling fluid having pseudoplastic properties. For example, the drilling fluid must be capable of having a low viscosity under the high shear rates such as encountered at the drill bit, yet have the ability to increase in viscosity (and, therefore, particle holding power) under decreasing shear rates encountered in its upward movement through the annulus.

In order to obtain the requisite pseudoplastic properties, it has been thought desirable to use clay or colloidal clay bodies such as bentonite. As a result, the drilling fluids have been usually referred to as "muds". The use of clay based drilling fluids has provided the means of initially meeting the two basic requirements of drilling fluids, i.e., cooling and particle removal. However, the clay-based drilling fluids are highly unstable when they come in contact with various salts found in drilled earth formations.

Materials which have come into expanding use to impart rheological properties to drilling compositions are xanthan gums such as are described in U.S. Pat. Nos. 3,198,268; 3,208,526; 3,251,147; 3,243,000; 3,307,016; 3,319,715 and 3,988,246. These materials have been found to cause aqueous solutions, such as drilling fluids, to exhibit pseudoplastic properties under varying low shear rates. However, these materials, whether used alone or in combination with other additives, present the problem of being irreversibly degraded by the elevated temperatures often encountered during conventional drilling operations and thereby require continuous supplementation of material. The high cost of the xanthan gums, and the high rate of degradation, limit their usefulness to specialized operations.

Prior utilization of hydroxides or hydrated metal oxides of amphoteric metals in well treating fluids have involved properties distinctly different from the properties required for a drilling fluid as described herein. For example, U.S. Pat. Nos. 3,614,985 and 3,815,681 describe a process for plugging a subterranean reservoir by permeating its pores with a solution containing an amphoteric metal salt and a pH increasing reactant to cause precipitation in the pores. U.S. Pat. No. 3,603,399 describes a process for treating a water sensitive formation by permeating its pores with a hydroxy-aluminum solution which is a clear and relatively non-viscous solution. In each of such prior well treating processes, it has been important that the solution have relatively low viscosity and high filter loss to ensure that the solution penetrates into the matrix or pores of the reservoir. In contrast, in a drilling fluid, it is important that the fluid be capable of having a high viscosity over the major region of its use (the annular region of the drill stem), exhibit a low viscosity at the drill bit site and be capable of not penetrating the formation and thereby leaving a filter cake over the entire bore hole. U.S. Pat. No. 3,860,070 describes a well completion or fracturing fluid containing an amphoteric metal salt and a base in a ratio to make the final solution strongly acidic in order to form a thickened fluid suitable as a fracturing fluid. Such fluids can not be used satisfactorily in a drilling operation due to their corrosive nature with respect to the metal drilling equipment. None of the various well treating fluids described in the above references would be suitable for their intended purpose if they contained a fluid loss agent.

The viscosity of a drilling fluid has been relied upon as a mode of aiding in fluid loss control with little success especially when drilling into and through porous substrates. To enhance the control, various agents have been added. For example, in U.S. Pat. No. 3,032,498 a cyanoethylated starch was described as a water loss controller when used in combination with a clay-based mud. U.S. Pat. No. 3,988,246 describes an esterified or etherified starch as a water loss controlling agent which is compatible with a xanthan gum based drilling mud. Other starches have been employed in clay free muds under limiting temperature conditions as starches are known to be temperature sensitive.

There is a general need for a composition which is capable of imparting both pseudoplastic and water loss controlling properties to aqueous compositions such as drilling fluid compositions. The composition should be stable to varying conditions and temperatures commonly encountered in drilling operations and must be easily produced at low cost to aid in the economics of drilling operations.

SUMMARY OF THE INVENTION

The present invention is directed to a composition capable of imparting both pseudoplasticity and water loss control to alkaline aqueous systems. The composition is a combination of:

(a) a hydroxy containing aluminum agent formed by mixing in an aqueous solution and under a high degree of agitation a water soluble basic agent selected from an alkali metal aluminate, alkali metal hydroxide or ammonium hydroxide with a water soluble acidic agent selected from an inorganic acid, or aluminum chloride, sulfate or nitrate such that at least one of said basic and acidic agent is an aluminum containing compound; and (b) a reaction product formed in an acidic medium between a polyvinyl alcohol with at least about 1 percent of stoichiometry of an aldehyde containing or generating agent.

The subject combination imparts pseudoplastic and water loss controlling properties unattributable to each of the components and which are stable to elevated temperature and conditions commonly encountered in bore hole drilling operations.

DETAILED DESCRIPTION OF THE INVENTION

The present invention is directed to a composition which is capable of imparting a high degree of psuedoplastic and water loss controlling properties to aqueous systems; to the use of such compositions to form an improved water-based, clay-free drilling fluid; and to drilling of bore holes into subterranean formations using said improved drilling fluid.

The subject composition is a combination of a hydroxy containing aluminum agent and a polyvinyl alcohol/aldehyde reaction product. The subject composition shall be described in terms of its use as a component of a drilling fluid.

The hydroxy containing aluminum agents found useful as a component of the composition of the present invention are agents which are substantially water-insoluble, that is, agents which are in suspension or dispersion in aqueous systems. Further, the subject hydroxy containing aluminum agents can be characterized as having an x-ray diffraction spectrum containing a major characterizing diffraction peak at 6.3±0.2 Angstroms or characterized by x-ray diffraction spectrum as being amorphous, that is, having substantially no x-ray diffraction pattern within the range of from 1.5 to 17 Angstroms. The spectrum is determined by standard techniques using the K-$\alpha$ doublet of copper as the radiation source.

The subject hydroxy containing aluminum agent of the subject invention is formed by contacting certain acidic agents with certain basic agents, as described below, in an aqueous medium under a high degree of agitation. The acidic and basic agents should be used in a ratio such that the resultant product is capable of imparting a pH of from about 8 to 10.3 to the water medium.

The basic agents useful in forming the hydroxy-containing aluminum component can be a water soluble basic material selected from an alkali metal aluminate, alkali metal hydroxide or ammonium hydroxide or mixtures thereof. Any alkali metal can be used such as sodium, potassium and the like with sodium being preferred.

The acidic agent useful in forming the hydroxy-containing aluminum component can be a water soluble acidic material selected from an inorganic acid as, for example, hydrochloric, sulfuric or nitric acid and the like, or an aluminum salt selected from aluminum chloride, aluminum nitrate or aluminum sulfate, their hydrates or mixtures of these acidic agents. At least one and preferably both the acidic and basic agents must be an aluminum containing agent. For example the hydroxy containing aluminum component may be formed from an alkali metal aluminate, such as sodium aluminate, and aluminum chloride hexahydrate in an aqueous system. The sodium aluminate is mixed with the aluminum chloride hexahydrates in an aqueous phase under high speed mixing. The aluminates which are useful normally will have an alkali metal oxide to aluminum oxide mole ratio of from about 1:1 to 2:1. These materials are commercially available. If desired solutions of one or both components can be made and then mixed together under high speed mixing to form the hydroxy containing aluminum agent.

The acidic and basic precursor agents can be present in concentrations of from about 5 to 25 percent by weight based on the water present. The concentration can vary outside of this range but should not be such as to inhibit the thorough mixing, preferably under high speed agitation, of the agents during the formation of hydroxy-containing aluminum component. The acidic and basic agents can be mixed using conventional equipment which can generate a high degree of agitation to the aqueous medium. The ratio of acidic and basic component should be such that a final pH of 8–10.3 and preferably 8.3–9.7 is obtained. The resultant aluminum component has hydroxyl groups as an integral part of its composition.

The polyvinyl alcohol reaction product found useful in forming the subject inventive composition is formed by contacting polyvinyl alcohol and an aldehyde containing or generating compound. The polyvinyl alcohols found useful in forming the subject reaction product have a weight average molecular weight of at least about 20,000 and preferably the weight average molecular weight should be from about 90,000 to 200,000. Conventionally polyvinyl alcohol is the hydrolyzed product of polyvinyl acetate. The hydrolysis should be at least about 75 percent complete and preferably from about 80 to 95 percent complete to form a suitable polyvinyl alcohol reactant. The polyvinyl alcohol reactant, such as formed from the hydrolysis of polyvinyl acetate or the like, can be reacted in an aqueous medium with an aldehyde containing or generating reactant. Suitable aldehyde containing reactants, i.e. organic compounds having at least one aldehyde group therein capable of reacting with the hydroxyl groups of polyvinyl alcohol, include, for example, formaldehyde, acetaldehyde, propionaldehyde, glycolaldehyde, glyoxalic acid and the like, or polyaldehydes such as glyoxal, paraformaldehyde and the like. Other suitable aldehyde reactants include aldehyde generating agents i.e. organic compounds capable of generating an aldehyde in situ, such as melamine-formaldehyde monomeric products and derivatives such as tri and hexa(methylol) melamine and the tri and hexa($C_1$–$C_3$ alkoxymethyl) melamine. Such materials can be formed by known conventional methods. The alkyl blocked derivatives are commercially available, are stable to self polymerization and are, therefore, preferred. Of all of the aldehyde reactants, the preferred reactants are paraformaldehyde and formaldehyde.

The subject polyvinyl alcohol reaction product found suitable in the subject composition to impart the combined desired properties can be formed by reacting a polyvinyl alcohol, as described above, with from at least about 1 and preferably from about 1 to 200 and most preferably 2 to 50 percent of stoichiometry of an aldehyde reactant based on the hydroxyl content of the polyvinyl alcohol. We define stoichiometry as the reaction of 2 OH groups with one aldehyde group to form an acetal. Excess aldehyde can be used. The particular quantity of aldehyde reactant will depend upon the solubility of the reactant in the aqueous reaction media, its reactivity and the like properties as is conventional to those skilled in this art. The reaction product should be dispersible in water. The reaction to form the polyvinyl alcohol reaction product can be carried out in an aqueous medium which should be acidic, that is, have a pH of 5.5 or less and preferably from 2 to 4.5 and which may contain other components, such as alkali metal sulfate in from 1% to saturation, to aid in the formation of the polymer product. The reaction can be carried out at ambient or elevated temperatures, such as from about 50° C. to 100° C. The solid product can be recovered by conventional techniques such as by salting out the product using suitable salts as, for example, sulfate, carbonate or phosphate salts, decantation, filtration and drying.

Compositions of the subject hydroxy-containing aluminum agent and the polyvinyl alcohol/aldehyde reaction product have unexpectedly been found to exhibit a combination of desired properties of pseudoplasticity and water-loss control which are unattainable by separate use of the materials or unattributable to the combination of the properties of each agent when used separately.

Amphoteric metal hydroxides formed in various manners and from various material are known to form a gelatinous mass in aqueous systems. Aqueous amphoteric metal hydroxide gels have been found useful for various purposes, such as coatings, adhesives and the like as well as in specific well treating compositions, such as fracturing or completion fluids. Such gels and compositions are used under conditions distinctly different than presently required and do not exhibit water-loss controlling properties. Although hydroxy-containing aluminum agents disclosed herein have been unexpectedly found capable, when used alone, of imparting a certain degree of pseudoplasticity to aqueous systems, they do not impart water-loss control to aqueous systems.

The presently described polyvinyl alcohol/aldehyde reaction products do not, when used alone, exhibit and impart water-loss control or pseudoplasticity to aqueous systems such as water-based clay-free drilling fluids.

It has been presently unexpectedly found that when the polyvinyl alcohol/aldehyde reaction product is combined with the hydroxy-containing aluminum agent one unexpectedly attains equal or superior pseudoplastic properties and an exceptionally high degree of water-loss control not attributable to either component. Further, uniqueness of the subject composition is shown by the fact that other trivalent metal hydroxides and the subject polyvinyl alcohol/aldehyde do not exhibit the desired properties.

The aqueous system which contains the subject composition should have an alkaline pH of from 8 to about 11.5 and preferably from 8.3 to 10.3. At these alkaline pH conditions, one attains the desired properties. Adjustment of the pH can be done with any water soluble inorganic base or acid such as alkali metal hydroxide or carbonate, alkaline earth metal hydroxide or a hydrohalic acid, sulfuric acid, nitric acid or sodium bicarbonate.

The aqueous system should be mixed to the extent required to cause the components of the composition to be substantially uniformly distributed therein. Further, the hydroxy aluminum containing aqueous medium or preferably the resultant composition containing system may have the combined described properties further enhanced by subjecting the system to mixing at high shear rates of about 20,000 sec.$^{-1}$ or greater for short periods of time such as from about 5 to 60 minutes as by circulating the aqueous system through a small internal diameter tube at high rate.

The aqueous medium in which the above-described hydroxy-containing aluminum agent is formed can be directly used to form the water-based drilling fluids of the subject invention. The aqueous medium can be diluted with a sufficient amount of water to form a system having from 0.5 to 10 percent, and preferably from 1.5 to 3.5 percent, by weight based on the weight of the water of the resultant hydroxy aluminum compound assuming a molecular formula of AlO(OH) for the hydroxy aluminum compound. The concentration most suitable can be readily determined in conventional manners by the mud engineer taking into consideration the concentration and nature of other materials which may also be contained in the drilling fluid.

The polyvinyl alcohol/aldehyde reaction product can be used in any effective amount which, when combined with the amount of aluminum component present, imparts water-loss control to the resultant aqueous system. Normally from 0.3 to 5 percent and preferably from 0.75 to 2 percent polyvinyl alcohol/aldehyde reaction product based on the weight of the water of the resultant aqueous system. The concentration most suitable can be readily determined in conventional manners taking into consideration the nature of the polymer i.e. molecular weight, hydroxyl content, aldehyde reactant, etc., as well as the nature and concentration of other materials contained in the aqueous system.

The ratio of the aluminum component to the polyvinyl alcohol product should be at least about 0.75:1 with ratios of from 0.75:1 to 3:1 preferred and from 1:1 to 3:1 being most preferred.

The above-described composition is capable of imparting to a clay-free, (the term "clay-free" when used herein refers to the absence of drilling fluid viscosifying clays as an essential agent of the fluid and not to other materials entrained therein) aqueous system, such as a water-based drilling fluid (the term "fluid" or "system" when used herein refers to water-based systems containing the subject composition) non-Newtonian, pseudoplasticity, that is to say, that the viscosity of the resultant fluid varies inversely with respect to the shear rate exerted on the fluid. The relationship of the shear stress with respect to shear rate can be defined by the rheological power law model relationship of $$\tau = K(\dot{\gamma})^n$$

in which $\tau$ represents the shear stress exerted on the aqueous system of the drilling fluid in units such as pounds per 100 ft$^2$ or dynes/cm$^2$; $\dot{\gamma}$ is the shear rate in units of reciprocal time such as sec$^{-1}$; K is a constant having the value of the shear stress of the particular aqueous system at a shear rate of 1 sec$^{-1}$; and n is a numerical value greater than zero. When n=1, the system is Newtonian; if n is less than 1, the system is pseudoplastic, and if n is greater than 1, the system is dilatant. It has been unexpectedly found that fluids containing the presently described composition exhibit shear stress ($\tau$) properties at varying shear rates ($\dot{\gamma}$) in the range of from about 10 to 400 sec$^{-1}$, that is, in the range normally encountered in the annular region of the bore hole such that n of the power law relationship has a value of less than about 0.4. Such systems, therefore, exhibit non-Newtonian, pseudoplastic properties to an exceptionally high and desirable degree.

The above-described composition has been unexpectedly found to exhibit a high degree of fluid loss control. That is to say that the fluid is capable of interacting with the adjacent porosity to inhibit loss of the fluid to the porous environment. The fluid loss of the system can be determined in accordance with the American Petroleum Institute's procedure API No RP-13B. After initial spurt, the desired water loss control attained with the subject composition is of less than about 20 ml per 30 minutes and, preferably, less than about 15 ml/30 min.

It has been further unexpectedly found that the subject composition has excellent stability to temperature, calcium and sodium salts and various other conditions desired of a fluid used in rotary drilling of bore holes and the like. The drilling fluids containing the subject composition have unexpectedly been found to have high degrees of stability with respect to their rheological and water loss properties under various adverse conditions. Such fluids have been found to be stable after subjection to elevated temperatures for sustained periods of time, to high shear rates such as are encountered at the site of the drill bit, as well as being stable in the presence of various corrosive elements such as calcium chloride, and sodium chloride which may be entrained in such fluids.

The high degree and breadth of stability of the presently achieved drilling fluid, when combined with its ability to exhibit non-Newtonian, pseudoplastic properties under varying low shear rates of from about 10 to 400 sec$^{-1}$ and greater, such as are encountered in the annular region between the drill stem and the casing of the bore hole, aids in increasing the drilling efficiency, that is, the rate of drilling the bore hole.

The drilling fluid composition of the subject invention can contain other conventional drilling fluid additives such as weighting agents as, for example, crushed oyster shells, barite and the like; thinner such as ferrochrome lignosulfonate and the like; lost-circulation agents such as ground walnut shells, cotton seed hulls and the like; pH adjusters such as MgO, sodium carbonate, sodium bicarbonate and the like; as well as other conventional additives.

The term "water-based" which is used herein in describing the present invention, generally includes drilling fluids which have a liquid base comprising substantially fresh water or salt water. However, it is to be realized that at times certain small amounts of other liquids may be emulsified or admixed with the water-based fluid. For example, drilling fluids may at times contain small amounts of oil, emulsified or admixed with the drilling fluid, the oil coming either from an oil formation drilled into or, under certain conditions, can be purposely added.

The present water-based, clay-free drilling fluids containing the subject composition described above and having a pH within the range of from at least about 8 to about 11.5, have been found to be stable to temperature, the presence of calcium and sodium salts and to the presence of conventional drilling fluid additives. Other viscosifiers and water loss controllers need not be present. Further, the present drilling fluids are substantially non-corrosive and non-destructive to metal equipment commonly used in drilling operations.

The subject composition can be used with conventional bore hole drilling equipment in manners known to those skilled in the art to efficiently and effectively drill bore holes into subterranean formations. The pseudoplastic and water loss control properties of drilling fluids containing said composition permit effective removal of the cuttings from the area at and around the drill bit to permit more efficient drilling of the formation when circulating the fluid during bore hole drilling.

The following examples are given for illustrative purposes only, and are not meant to be a limitation on the subject invention except as indicated by the appended claims. All parts and percentages are by weight unless otherwise indicated. The units of K of the power law is lb-sec/100 ft².

EXAMPLE I

Formation of Polyvinyl Alcohol/Aldehyde (PVA/A) Products

A. 5.625 parts of a commercially obtained polyvinyl alcohol having a weight average molecular weight = 125,000 and 87% hydrolyzed (Gelvatol 20-90) was dissolved in 94.375 parts water. The pH of the solution was adjusted to 5.0 with dilute hydrochloric acid. 1.013 parts of paraformaldehyde (50 percent of stoichiometry) was added to the solution which was then heated to 60° C. with stirring and maintained at that temperature for 30 minutes. The solution was allowed to cool, and had its pH adjusted to 9.5 with a 10% sodium hydroxide solution.

B. A second polyvinyl alcohol/aldehyde product was formed by initially dissolving 11.25 parts of the commercial polyvinyl alcohol described above in 88.75 parts of water and then adjusting the pH of the solution to 3.0 with dilute HCl. 3.83 parts paraformaldehyde (100% stoichiometry) was added and the mixture was stirred and heated to 85° C. and maintained at this temperature for 60 minutes. After cooling, the solution was diluted with an equal part of water and the pH of the solution was adjusted to 9.5 with a 10% sodium hydroxide solution.

EXAMPLE II

Formation of Hydroxy-Containing Aluminum Agent 15.3 parts of commercially obtained sodium aluminate ($Na_2O.Al_2O_3.3H_2O$) powder was mixed with 12.2 parts of commercially obtained aluminum chloride hexahydrate powder. The mixture was added to 350 parts water and subjected to high speed mixing using a Hamilton Beach Model 936-2 mixer for 20 minutes. The aqueous dispersion was allowed to sit for 16 hours and then again subjected to high speed mixing for 5 minutes. The pH of the resultant dispersion was 8.5 and was adjusted to 9.5 with dilute NaOH.

The hydroxy-containing agent concentrations will be determined herein below based on the formula AlO(OH) although the subject agent may be present in other forms.

EXAMPLE III

For comparative purposes, aqueous samples of hydroxy-containing aluminum and of polyvinyl alcohol-/aldehyde reaction products, respectively, were tested for rheology and water-loss control.

An aqueous system having 3 percent hydroxy-containing aluminum product therein (prepared according to Example II above) and having a pH of 9.5 was subjected to rheological analysis using standard procedures with a Haake Rotovisco RV-1 rotating rheometer at varying shear rates of from 8 to 800 sec$^{-1}$ and at 25° C. The values determined for n and K was 0.28 and 3.0, respectively in accordance with the power law model relationship $\tau = K(\dot{\gamma})^n$ in which $\tau$ represents shear stress exerted on the aqueous system in units of pounds per 100 ft² or dynes per centimeter square; $\dot{\gamma}$ is the shear rate in units of reciprocal times such as sec$^{-1}$; K is a constant having a value of shear stress at a shear rate of one sec$^{-1}$ and have units of pound-seconds/100 ft²; and n is a numerical value of from 0 to 1. Pseudoplastic systems have a value for n of less than about 0.4. The fluid loss control of the material was determined using American Petroleum Institute (API) procedure RP 13B at 100 psi and 25° C. A fluid loss control value of greater 200 ml/30 minute was obtained. The product imparted good pseudoplasticity but substantially no fluid loss control.

The polyvinyl alcohol/paraformaldehyde products of Example I were diluted with water to form aqueous systems having 1.5 percent PVA/A. The rheology and fluid loss control were determined in the same manner and procedures described with respect to the hydroxy-containing aluminum compound herein above. The materials were found to be Newtonian (n=1, K = <0.1), and to have a fluid loss of greater than 200 ml/30 minutes. The PVA/A reaction products do not impart pseudoplasticity nor fluid loss control.

EXAMPLE IV

This example illustrates that aqueous systems containing a mixture of the hydroxy-containing aluminum compound and the polyvinyl alcohol-paraformaldehyde reaction product exhibit both good rheology and good fluid loss control and are stable even when subjected to elevated temperatures for sustained periods of time.

Four parts of the hydroxy-containing aluminum product prepared in the manner described in Example II was mixed with 1 part of the polyvinyl alcohol-paraformaldehyde product (PVA/A) prepared in the manner described in Example I(B). The resultant aqueous composition contained a uniform mixture of 2.4 percent hydroxy-containing aluminum product [symbolized as AlO(OH)] and 1.5 percent PVA/A product. A sample (Sample 1) was taken of the composition to determine its rheology and fluid loss control at 25° C. by the methods described in Example III. A second sample (Sample 2) of the composition was placed in a vessel under a $N_2$ atmosphere, sealed and subjected to 122° C. (250° F.) for 16 hours while under constant agitation and then allowed to cool to room temperature. The rheology and fluid loss control of the heat treated composition were determined. Finally, a third sample (Sample 3) of the composition was subjected to elevated temperature (250° F./16 hours) and was then subjected to high shear forces by circulating the sample composition through a capillary tube (I.D.=0.0314 inch) for 30 minutes to given an approximate calculated shear rate of 25,000 sec$^{-1}$. The rheology and fluid loss control of this sample were determined. A summary of the results are contained in Table I below.

The fluid loss determined according to API procedure RP 13B yields a total fluid loss (TFL) in ml/30 minutes) which is the cumulative value of the initial spurt (Sp in ml) and the corrected fluid loss (CFL in ml/30 min). The spurt is obtained by plotting cumulative volume on the y axis and the square root of time on the x axis and then extrapolating the straight line back to the y axis. The intercept is the value of the spurt volume. The corrected fluid loss is obtained by subtracting the spurt value from the total fluid loss volume. The corrected fluid loss value is the rate of loss the fluid would be expected to exhibit over an extended period.

TABLE I

Rheology and Fluid Loss Control
Hydroxy Aluminum - PVA/A Composition

| Sample | AlO(OH) (%) | PVA/A (%) | n | K | TFL | Sp | CFL |
|---|---|---|---|---|---|---|---|
| 1 | 2.4 | 1.5 | 0.21 | 10.0 | 9.6 | 1.6 | 8.0 |
| 2 | 2.4 | 1.5 | 0.27 | 27.0 | 12.0 | 3.2 | 8.8 |
| 3 | 2.4 | 1.5 | 0.19 | 23.0 | 11.0 | 2.3 | 8.7 |

EXAMPLE V

The procedures described in Example IV above were repeated except that the compositions formed further contained the addition of 3.5 percent salt (NaCl) to simulate a brine system or 2.85 percent Glen Rose shale to simulate rock cuttings. The results are given in Table II below and show that neither salt nor rock cuttings adversely affected the rheology and fluid loss control properties of aqueous systems having the hydroxy-containing aluminum and PVA/A composition.

TABLE II

Stability of Composition To NaCl and Simulated Rock Cuttings

| Sample Number | Treatment | AlOOH (%) | PVA/A (%) | NaCl (%) | Glen Rose Shale (%) | n | K | TFL | Sp | CFL |
|---|---|---|---|---|---|---|---|---|---|---|
| 1 | 25° C. | 2.3 | 1.4 | 3.5 | 0 | 0.25 | 6.6 | 7.6 | 0.3 | 7.3 |
| 2 | 122° C./16 hrs | 2.3 | 1.4 | 3.5 | 0 | 0.15 | 35.0 | 10.0 | 2.7 | 7.3 |
| 3 | 122° C./16 hrs /Shear | 2.3 | 1.4 | 3.5 | 0 | 0.16 | 27.0 | 14.8 | 6.3 | 8.5 |
| 4 | 25° C. | 2.3 | 1.5 | 0 | 2.85 | 0.22 | 8.0 | 9.2 | 1.1 | 8.1 |
| 5 | 122° C./16 hrs | 2.3 | 1.5 | 0 | 2.85 | 0.21 | 16.0 | 13.2 | 1.6 | 11.6 |
| 6 | 122° C./16 hrs /Shear | 2.3 | 1.5 | 0 | 2.85 | 0.34 | 17.0 | 10.2 | 0 | 10.2 |

EXAMPLE VI

An aqueous system was prepared according to the procedures described in Example IV except that the PVA/A reaction product used was prepared as described in Example I(A). Portions of the formed system were prepared into an aqueous system with no additives; with a combination of $CaCl_2$ and NaCl to determine effect of presence of calcium and of salt; and with barite, a commonly drilling fluid weighting agent. The rheology and fluid loss control of each composition was determined in the manner described in Example IV. Results are given in Table III and show good combined properties are attained in each case.

TABLE III

Effect of $CaCl_2$, NaCl and Barite Additives

| Sample Number | Treatment | AlOOH (%) | PVA/A (%) | NaCl (%) | $CaCl_2$ (%) | Barite (%) | n | K | TFL | Sp | CFL |
|---|---|---|---|---|---|---|---|---|---|---|---|
| 1 | 25° C. | 2.4 | 1.3 | 0 | 0 | 0 | 0.31 | 3.4 | 39.5 | 23.6 | 15.9 |
| 2 | 122° C./16 hrs | 2.4 | 1.3 | 0 | 0 | 0 | 0.27 | 10.0 | 26.0 | 9.2 | 16.8 |
| 3 | 122° C./16 hrs /Shear | 2.4 | 1.3 | 0 | 0 | 0 | 0.27 | 18.0 | 15.5 | 4.6 | 10.9 |
| 4 | 25° C. | 2.2 | 1.2 | 3.5 | 5.0 | 0 | 0.37 | 1.2 | 22.0 | 16.8 | 5.2 |
| 5 | 122° C./16 hrs | 2.2 | 1.2 | 3.5 | 5.0 | 0 | 0.18 | 4.6 | 35.4 | 16.0 | 19.4 |
| 6 | 122° C./16 hrs /Shear | 2.2 | 1.2 | 3.5 | 5.0 | 0 | 0.43 | 7.6 | 12.0 | 2.6 | 9.4 |
| 7 | 25°C. | 1.7 | 1.6 | 0 | 0 | 31.4 | 0.36 | 8.2 | 29.8 | 20.4 | 9.4 |
| 8 | 122° C./16 hrs /Shear | 1.7 | 1.6 | 0 | 0 | 31.4 | 0.42 | 26.0 | 6.6 | 2.2 | 4.4 |

EXAMPLE VII

Polyvinyl alcohol-paraformaldehyde products were prepared, formed into dried products and reconstituted with water to determine their effectiveness when used in combination with a hydroxy-containing aluminum agent.

A. A polyvinyl alcohol-paraformaldehyde reaction product was formed in the manner described in Example I(a) except that the polyvinyl alcohol was dispersed in a 6 percent sodium sulfate aqueous solution to form a 16.7 percent concentration of polymer. After reaction and pH adjustment, the product was filtered and air dried at 50° C. for 16 hours. The dried prill product was redispersed in water by simple mixing to form an aqueous solution having the same PVA/A product concentration of 5.63 percent as in Example I(A). This solution was mixed in a ratio of 1:4 with an aqueous dispersion of hydroxy-containing aluminum agent prepared in the manner described in Example II above. Aqueous systems containing the combined agents were tested for rheology and fluid loss control. The results given in Table IV below show that excellent performance is obtained.

B. The procedure described in the above paragraph was repeated with the exceptions that the concentration of sodium sulfate was increased from 6 to 16 percent and the initial polyvinyl alcohol concentration was increased from 16.7 to 25 percent. The product was readily dried to a fluffy white powder which readily redispersed. The rheology and fluid loss control test results given in Table IV below show excellent performance.

TABLE IV

| Sample | Treatment | AlOOH (%) | PVA/A (%) | n | K | TFL | Sp | CFL |
|---|---|---|---|---|---|---|---|---|
| Prepared From 6% Na$_2$SO$_4$ Solution | | | | | | | | |
| 1 | 25° C. | 2.4 | 1.3 | 0.23 | 7.4 | 9.4 | 0 | 9.4 |
| 2 | 122° C./16 hrs | | | 0.25 | 13.2 | 28.2 | 14.4 | 13.8 |
| 3 | 122° C./16 hrs/Shear | | | 0.29 | 14.0 | 15.6 | 4.8 | 10.8 |
| Prepared From 16% Na$_2$SO$_4$ Solution | | | | | | | | |
| 4 | 25° C. | 2.4 | 1.3 | 0.22 | 7.5 | 13.2 | 4.2 | 9.0 |
| 5 | 122° C./16 hrs | | | 0.34 | 7.8 | 24.8 | 12.1 | 12.7 |
| 6 | 122° C./16 hrs/Shear | | | 0.31 | 10.0 | 16.2 | 5.4 | 10.8 |

EXAMPLE VIII

Aqueous systems of polyvinyl alcohol-paraformaldehyde reaction product and of hydroxy-containing aluminum agent were prepared in the same manner as described in Example I(A) and II, respectively. A 4:1 mixture of the respective systems was prepared and then heated at 122° C. (250° F.) for 16 hours with constant agitation. Conventional thinners were added to portions of the resultant composition. Rheology and fluid loss control tests were performed as described in Example IV above. The results given in Table V below show that reduction in viscosity can be achieved (reduction in value of K) without any adverse effect to pseudoplasticity (n) or fluid loss control.

TABLE V

Composition: 2.4% AlO(OH); 1.3% PVA/A With Thinner

| Sample | Thinner[1] (%) | n | K | TFL | Sp | CFL |
|---|---|---|---|---|---|---|
| 1 | None | 0.30 | 15.0 | 15.4 | 4.6 | 10.8 |
| 2 | SHMP (0.5) | 0.11 | 7.6 | 15.5 | 4.6 | 10.9 |
| 3 | STPP (1) | 0.15 | 9.4 | 17.0 | 7.0 | 10.0 |
| 4 | FCLS (0.5) | 0.21 | 3.3 | 12.5 | 3.0 | 9.5 |

[1]SHMP = Sodium hexametaphosphate
STPP = Sodium tripolyphosphate
FCLS = Ferrochrome lignosulfonate

EXAMPLE IX

A polyvinyl alcohol-aldehyde reaction product was prepared in the same manner as described in Example I(A) with the exception that an equal weight of formaldehyde was substituted for paraformaldehyde.

The resultant solution of PVA/A reaction product was mixed with an aqueous dispersion of the hydroxy-containing aluminum agent of Example II in the same manner as described in Example IV and the properties of the resultant aqueous system determined by the procedures described in Example IV. The results (Table VI) show that performance of rheology and fluid loss control equivalent to the performance obtained with paraformaldehyde reaction product.

TABLE VI

Composition: 2.4% AlO(OH) & 1.3% PVA/Formaldehyde

| Sample | Treatment | n | K | TFL | Sp | CFL |
|---|---|---|---|---|---|---|
| 1 | 25° C. | 0.20 | 8.4 | 26.6 | 15.0 | 11.6 |
| 2 | 122° C./16 hrs | 0.23 | 11.5 | 20.0 | 9.0 | 11.0 |
| 3 | 122° C./16 hrs/Shear | 0.24 | 18.0 | 12.8 | 1.9 | 10.9 |

EXAMPLE X

A polyvinyl alcohol reaction product was formed in the same manner as described in Example I(A) except that 0.15 part hexamethoxymethyl melamine (HMMM) as an aldehyde generating agent was substituted for the paraformaldehyde; the pH of the initial solution was adjusted to 3.0; the reaction temperature was 90° C.; and reaction time was 1 hour. The resultant product was mixed with an aqueous dispersion of hydroxy-containing aluminum agent of the type and in the manner described in Example IV. Rheology and fluid loss control of the resultant system was tested as described in Example IV. The results are given in Table VII below.

TABLE VII

Composition: 2.4% AlO(OH) & 1.1% PVA/HMMM

| Sample | Treatment | n | K | TFL | Sp | CFL |
|---|---|---|---|---|---|---|
| 1 | 25° C. | 0.27 | 11.0 | 16.4 | 5.8 | 10.6 |
| 2 | 122° C./16 hrs | 0.24 | 6.4 | 31.4 | 10.6 | 20.8 |
| 3 | 122° C./16 hrs/Shear | 0.36 | 8.4 | 16.0 | 0 | 16.0 |

EXAMPLE XI

Commercially available polyvinyl alcohols of varying molecular weights were used to prepare the PVA/aldehyde reaction product according to the procedure of Example I(A). The resultant aqueous systems containing each of the reaction products were tested for rheology and fluid loss control and were found to be Newtonian and of greater than 200 ml/30 min, respectively. Each of the systems were combined as described in Example IV with dispersions of a hydroxy-containing aluminum agent prepared as in Example II and, in certain cases with the addition of NaCl, and retested. The results are given in Table VIII below.

TABLE VIII

Composition: 2.4% AlO(OH) & 1.3% PVA/A

| PVA MW | % Hydrolyzed | NaCl | n | K | TFL | Sp | CFL |
|---|---|---|---|---|---|---|---|
| 12,000[c] | 85 | | 0.18 | 7.0 | 135 | 0 | 135 |
| 35,000 | 100 | 3.5 | 0.24 | 2.6 | 31.4 | 18.2 | 13.2 |
| 120,000 | 100 | 3.5 | 0.21 | 3.8 | 18.5 | 6.4 | 12.1 |
| 170,000 | 100 | 3.5 | 0.24 | 5.2 | 15.5 | 5.1 | 10.4 |

[c]For Comparative Purposes.

EXAMPLE XII

Aqueous systems of PVA/A reaction product prepared according to Example I(A) and of hydroxy-containing aluminum agent prepared according to Example II were mixed in varying proportions of from 1.4:1 to 2.2:1. The resultant compositions of the mixtures were tested for rheology and fluid loss control in the manner described in Example IV. The results are given in Table IX below.

TABLE IX

| Sample | Treatment[1] | AlO(OH) % | PVA/A % | n | K | CFL |
|---|---|---|---|---|---|---|
| 1 | A | 1.8 | 1.3 | 0.4 | 0.9 | 21.0 |

TABLE IX-continued

| Sample | Treatment[1] | AlO(OH) % | PVA/A % | n | K | CFL |
|---|---|---|---|---|---|---|
| 2 | B | 1.8 | 1.3 | 0.4 | 2.8 | 11.8 |
| 3 | C | 1.8 | 1.3 | 0.3 | 14.0 | 10.9 |
| 4 | A | 2.1 | 1.3 | 0.4 | 2.0 | 18.4 |
| 5 | B | 2.1 | 1.3 | 0.3 | 5.2 | 17.5 |
| 6 | C | 2.1 | 1.3 | 0.4 | 11.0 | 14.2 |
| 7 | A | 2.4 | 1.3 | 0.3 | 3.4 | 15.9 |
| 8 | B | 2.4 | 1.3 | 0.3 | 10.0 | 16.8 |
| 9 | C | 2.4 | 1.3 | 0.3 | 18.0 | 10.9 |
| 10 | A | 2.4 | 1.1 | 0.2 | 2.7 | 21.1 |
| 11 | B | 2.4 | 1.1 | 0.3 | 6.6 | 23.5 |
| 12 | C | 2.4 | 1.1 | 0.3 | 17.0 | 17.4 |

[1] A = 25° C.
B = 122° C./16 hrs
C = 122° C./16 hrs/Shear

EXAMPLE XIII

PVA/A reaction product was formed according to Example VII B above to a dried product having 12 percent moisture content. The dried PVA/A and dried AlO(OH) agent formed according to Example II were reconstituted in water to a concentration of 2.4 percent AlO(OH) and 1.3 percent PVA/A (dry basis). The resultant system was tested for rheology and fluid loss control as described in Example IV. The results given in Table X below show that aqueous systems containing the combination of such agents exhibited excellent rheological and fluid loss control properties.

TABLE X

| Sample | Reconstituted Components Treatment | n | K | TFL | Sp | CFL |
|---|---|---|---|---|---|---|
| 1 | 25° C. | 0.21 | 11.2 | 8.0 | 0 | 8 |
| 2 | 122° C./16 hrs | 0.27 | 10.5 | 19.4 | 5.1 | 14.3 |
| 3 | 122° C./16 hrs/Shear | 0.30 | 12.0 | 17.0 | 6.4 | 10.6 |

EXAMPLE XIV

Compositions are formed with PVA/A reaction product of Example I(A) and with hydroxy-containing aluminum agents which are formed from the following agents:

1. 227.6 parts of a 19.1% aqueous solution of commercial sodium aluminate with 416 parts of 1 N HCl. pH of 9.6 attained. 7 parts of resultant product diluted with 3 parts water to give 3.5% AlO(OH).

2. 238 parts of a 34.7% aqueous solution of Al$_2$(SO$_4$)$_3$ 16H$_2$O with 102 parts of 30.5% solution NaOH. pH=9.5. Solution diluted with 18.5 parts water.

Each of the compositions exhibits good combination of rheological and fluid loss control properties.

EXAMPLE XV

The procedures described in Example IV above were repeated except that the pH of the resultant samples were adjusted to various values of from 8.5 to 11.5. The PVA/PF product was formed as described in Example 1(B) except at 60° C. and with the addition of 16 percent sodium sulfate. The final pH adjustment was made in all cases by adding 1 part solid sodium carbonate to 99 parts of the mixed aqueous composition. (Concentration of AlO(OH)=2.3%; of PVA/PF=1.6%) and then adjusting to the desired pH value with a 10% sodium hydroxide solution (for pH values above 10.5) or with a 1% HCl solution (for pH values below 10.5). Certain samples indicated below contained 0.5% ground limestone to simulate rock cuttings. The results given in Table XI below show the desired properties are attained at varying pH values within the range of about 8 to about 11.5.

TABLE XI

| Sample | Treatment | Adjusted pH | n | K | TFL | Sp | CFL |
|---|---|---|---|---|---|---|---|
| 1 | 1 | 8.5 | 0.50 | 0.80 | 16.5 | 7.2 | 9.3 |
| 2 | 2 | | 0.18 | 9.0 | 21.0 | 9.4 | 11.6 |
| 3 | 2(a) | | 0.18 | 9.0 | 13.0 | 0.6 | 12.4 |
| 4 | 1 | 9.6 | 0.32 | 3.0 | 7.1 | 0.0 | 7.1 |
| 5 | 2 | | 0.19 | 9.8 | 11.8 | 3.2 | 8.6 |
| 6 | 3 | | 0.28 | 22.0 | 9.4 | 1.4 | 8.0 |
| 7 | 1 | 10.0 | 0.32 | 2.0 | 7.8 | 1.0 | 6.8 |
| 8 | 2 | | 0.19 | 5.4 | 15.8 | 6.0 | 9.8 |
| 9 | 2(a) | | | | 9.4 | 0.9 | 8.5 |
| 10 | 3(a) | | 0.25 | 12.0 | 6.6 | 0.0 | 6.6 |
| 11 | 1 | 10.5 | 0.26 | 3.9 | 6.0 | 0.0 | 6.0 |
| 12 | 2 | | 0.18 | 8.6 | 24.2 | 16.6 | 7.6 |
| 13 | 3 | | 0.11 | 20.0 | 19.9 | 12.6 | 7.3 |
| 14 | 1 | 11.0 | 0.31 | 2.5 | 5.8 | 0.0 | 5.8 |
| 15 | 2 | | 0.30 | 3.1 | 16.6 | 8.4 | 8.2 |
| 16 | 2(a) | | | | 7.6 | 0.3 | 7.3 |
| 17 | 3(a) | | 0.25 | 10.0 | 6.0 | 0.0 | 6.0 |
| 18 | 1 | 11.5 | 0.20 | 4.5 | 6.5 | 0.0 | 6.5 |
| 19 | 2(a) | | 0.22 | 6.0 | 8.1 | 0.6 | 7.5 |
| 20 | 3(a) | | 0.28 | 7.4 | 7.4 | 0.2 | 7.2 |

Treatment:
1 is 25° C.
2 is 122° C./16 hrs.
3 is 122° C./16 hrs. then sheared at 25,000 sec$^{-1}$ for 30 min.
(a) 0.5% ground limestone added.

EXAMPLE XVI

A polyvinyl alcohol reaction product was formed in the same manner as described in Example I(A) except that the pH was adjusted to 3.0 with dilute sulfuric acid and the aldehyde reactant was formaldehyde used in 5 percent of stoichiometry. The formed material was mixed with an aqueous dispersion of hydroxy-aluminum agent formed in the manner described in Example II. The pH of the system was adjusted to 9.5 and contained 1.6% polyvinyl alcohol reaction product and 2.4% aluminum agent. 0.5% of ground limestone was added. The resultant system was tested for fluid loss control and rheology according to the procedure of Example IV. The material was pseudoplastic and had a TFL of 10.4; a spurt of 2.3 and a CFL of 8.1. The sample was subjected to elevated temperature of 250° F. for 16 hours under a nitrogen atmosphere while being agitated. The sample was cooled and the fluid loss properties were found to be TFL of 12.6; spurt of 4.3; and CFL of 8.3. The cake was 2/32 inch thick.

While the invention has been described in connection with certain preferred embodiments, it is not intended to limit the invention to the particular forms set forth but, on the contrary, it is intended to cover such alternatives, modifications and equivalents as defined by the appended claims.

What is claimed:

1. A composition capable of imparting to clay-free aqueous systems a combination of pseudoplasticity and fluid loss control comprising a mixture of:
  (a) a hydroxy containing aluminum component formed by mixing in an aqueous medium and under a high degree of agitation of water-soluble basic agent selected from the group consisting of an alkali metal aluminate, alkali metal hydroxide, ammonium hydroxide and mixtures thereof with a water-soluble acidic agent selected from an inorganic acid, aluminum chloride, aluminum sulfate, aluminum nitrate, their hydrates and mixtures thereof; at least one of said basic and acidic agents being an aluminum containing compound: said acidic and basic agents being reacted in a ratio such that the resultant product imparts to said aqueous medium pH of from at least about 8 to about 10.3; in combination with (b) a reaction product formed in an aqueous acidic medium having a pH of less than about 5.5 between polyvinyl alcohol having a weight average molecular weight of at least 20,000 with at least 1 percent of stoichiometry of a compound containing at least one aldehyde group therein or capable of generating in situ at least one aldehyde group; wherein the amount of component (a) to component (b) is in the weight ratio of at least about 0.75:1.

2. The composition of claim 1, wherein the mixture is dispersed in an aqueous medium.

3. The composition of claim 1, wherein the component (a) is formed from an alkali metal aluminate with an acidic agent selected from the group consisting of an inorganic acid, aluminum chloride and aluminum nitrate, their hydrates and component (b) is formed with an aldehyde agent in from about 1 to 200 stoichiometric percent and in an aqueous medium having a pH of less than about 5.5.

4. The composition of claim 3, wherein the component (a) is formed from an alkali metal aluminate and an aluminum chloride and component (b) is formed with an aldehyde agent in from about 2 to 50 stoichiometric percent and in an aqueous medium having a pH of from about 2 to 4.5.

5. The composition of claim 3, wherein the component (a) is formed from an alkali metal hydroxide or ammonium hydroxide and an aluminum compound selected from the group consisting of aluminum chloride, aluminum nitrate and aluminum sulfate, their hydrates or mixtures thereof and component (b) is formed with an aldehyde agent in from about 2 to 50 stoichiometric percent and in an aqueous medium having a pH of from about 2 to 4.5.

6. The composition of claim 1, wherein the polyvinyl alcohol has a weight average molecular weight of from about 90,000 to 200,000 and is at least about 75 percent hydrolyzed.

7. The composition of claim 6, wherein the aldehyde agent is selected from the group consisting of a trialkoxymethyl melamine, paraformaldehyde and formaldehyde and the polyvinyl alcohol is from 80 to 95 percent hydrolyzed.

8. A composition capable of imparting to clay-free aqueous systems a combination of pseudoplasticity and fluid loss control comprising a mixture of:

(a) a hydroxy containing aluminum component formed by mixing in an aqueous medium and under a high degree of agitation a water-soluble basic agent selected from the group consisting of an alkali metal aluminate, alkali metal hydroxide, ammonium hydroxide and mixtures thereof with a water-soluble acidic agent selected from an inorganic acid, aluminum chloride, aluminum sulfate, aluminum nitrate, their hydrates and mixtures thereof; at least one of said basic and acidic agents being an aluminum containing compound: said acidic and basic agents being reacted in a ratio such that the resultant product imparts to said aqueous medium a pH of from at least about 8 to about 10.3; in combination with (b) a reaction product formed in an aqueous acidic medium having a pH of less than about 5.5 between polyvinyl alcohol having a weight average molecular weight of at least 20,000 and is at least about 75 percent hydrolyzed with from about 1 to 200 percent of stoichiometry of a compound containing at least one aldehyde group therein or capable of generating in situ at least one aldehyde group, said compound selected from the group consisting of formaldehyde, acetaldehyde, propionaldehyde, glycolaldehyde, glyoxalic acid, glyoxal, paraformaldehyde, tri(methylol) melamine, hexa(methylol) melamine, tri($C_1$–$C_3$ alkoxymethyl) melamine and hexa($C_1$–$C_3$ alkoxymethyl) melamine;

wherein the amount of component (a) to component (b) is in the weight ratio of from about 0.75:1 to about 3:1.

9. In a water-based, clay-free drilling fluid suitable for circulating in a bore hole while drilling the bore hole into subterranean formations which include, water, a rheology enhancing agent and a fluid-loss controller, said improvement comprises that said rheology enhancing agent and fluid-loss controlling agent are, in combination, the composition of claim 1, 2, 3, 4, 5, 6, 7 or 8 present in said fluid in from about 1 to 15 percent by weight based on the weight of the water present in said fluid and said fluid is maintained at a pH of from about 8 to 11.5.

10. The drilling fluid of claim 9, wherein the aqueous fluid has a pH of from 8.3–10.3.

11. In a process of drilling a bore hole into a subterranean formation using conventional bore hole drilling equipment, the improvement comprising circulating in the bore hole while drilling the drilling fluid of claim 9.

* * * * *

UNITED STATES PATENT AND TRADEMARK OFFICE
CERTIFICATE OF CORRECTION

PATENT NO. : 4,349,443
DATED : September 14, 1982
INVENTOR(S) : Jacob Block

It is certified that error appears in the above-identified patent and that said Letters Patent are hereby corrected as shown below:

In Claim 1, line 6, delete "agitation of" and insert -- agitation a --;

Column 17, line 11, delete "at least 1" and insert -- from about 1 to 200 --;

Column 17, line 16, after "0.75:1" insert -- to about 3:1 --.

Signed and Sealed this

Seventh Day of December 1982

[SEAL]

Attest:

Attesting Officer

GERALD J. MOSSINGHOFF

Commissioner of Patents and Trademarks